United States Patent
Kohll et al.

(10) Patent No.: US 12,420,357 B2
(45) Date of Patent: Sep. 23, 2025

(54) METHOD FOR PROCESSING RECHARGEABLE BATTERIES

(71) Applicant: Circu Li-ion S.A., Foetz (LU)

(72) Inventors: Alexander Xavier Christof Kohll, Saeul (LU); Karthik Mathivanan, Luxembourg (LU); Harry I. Schaaf, Rheinmünster (DE)

(73) Assignee: Circu Li-ion S.A., Luxembourg (LU)

(*) Notice: Subject to any disclaimer, the term of this patent is extended or adjusted under 35 U.S.C. 154(b) by 96 days.

(21) Appl. No.: 18/234,554

(22) Filed: Aug. 16, 2023

(65) Prior Publication Data

US 2024/0058897 A1 Feb. 22, 2024

(30) Foreign Application Priority Data

Aug. 20, 2022 (DE) .................... 10 2022 121 095.2

(51) Int. Cl.
| | |
|---|---|
| *B23K 26/36* | (2014.01) |
| *H01M 10/052* | (2010.01) |
| *H01M 10/54* | (2006.01) |
| *H01M 10/054* | (2010.01) |
| *H01M 10/058* | (2010.01) |

(52) U.S. Cl.
CPC .......... *B23K 26/36* (2013.01); *H01M 10/052* (2013.01); *H01M 10/54* (2013.01); *H01M 10/054* (2013.01); *H01M 10/058* (2013.01)

(58) Field of Classification Search
CPC .... B23K 26/36; H01M 10/052; H01M 10/54; H01M 10/054; H01M 10/058
See application file for complete search history.

(56) References Cited

U.S. PATENT DOCUMENTS

| | | | |
|---|---|---|---|
| 9,257,695 B2* | 2/2016 | Liang | H01M 4/1395 |
| 11,088,406 B2* | 8/2021 | Muraoka | H01M 10/54 |

FOREIGN PATENT DOCUMENTS

| | | |
|---|---|---|
| CN | 103138019 | 6/2013 |
| CN | 112570907 | 3/2021 |
| CN | 112589276 | 4/2021 |
| CN | 213351227 | 6/2021 |
| CN | 216311882 | 4/2022 |
| KR | 102409527 | 6/2022 |

* cited by examiner

*Primary Examiner* — Ryan J. Walters
(74) *Attorney, Agent, or Firm* — Pandiscio & Pandiscio

(57) ABSTRACT

The invention relates to a method for processing rechargeable batteries. The object of the invention described here is to provide a method for processing rechargeable batteries, via which rapid, resource-conserving, cost-effective, and sustainable reprocessing of a rechargeable battery is made possible. This is achieved by the method according to the invention in that the rechargeable battery is discharged, the discharged rechargeable battery is opened, the opened rechargeable battery is broken down into its single cells, and the condition of the single cells is checked.

8 Claims, 2 Drawing Sheets

METHOD FOR PROCESSING RECHARGEABLE BATTERIES

REFERENCE TO PENDING PRIOR PATENT APPLICATION

This patent application claims benefit of German Patent Application No. 10 2022 121 095.2, filed Aug. 20, 2022, which patent application is hereby incorporated herein by reference.

FIELD OF THE INVENTION

The invention relates to a method for processing rechargeable batteries.

BACKGROUND OF THE INVENTION

For example, the metallurgical processing of batteries, in particular lithium-ion and lithium-polymer rechargeable batteries, in order to recover recyclable materials, for example cobalt, nickel, and copper, contained in a battery cell is previously known from the prior art. Many valuable resources are lost due to the limited recycling thus far of these rechargeable batteries.

In particular with regard to the sought energy transition via the use of electric vehicles, for which the use of rechargeable batteries is intended, in view of the current state of the art this is at least questionable, since economically justifiable recycling methods are not known to date.

Thus, for example, it is still not clear how the EU Battery Directive 2006/66/EG is to be implemented. In conjunction with the use of lithium-ion rechargeable batteries, for example, in this regard a recycling rate of at least 50% is required.

Some methods for recycling rechargeable batteries rely on pyrometallurgical and/or hydrometallurgical processes. Within the scope of these processes, only selected recyclable materials, for example cobalt or nickel, can be recovered. Other components of the rechargeable batteries, such as aluminum, lithium, separator films, graphite, and plastics that are present, are usually just incinerated.

For safety reasons, extensive preparatory steps are necessary prior to the actual mechanical recycling. Thus, a standard rechargeable battery, which may be made up of 100 or more single cells, may be disassembled down to the individual cell or module level. The disassembly, which is usually performed by hand, is time-consuming, depending on the type of composition of the rechargeable battery and the type of connection. According to one publication, it takes a worker between 55 and 95 minutes to dismantle the batteries in question, depending on the cell type.

In this regard, it has been at least attempted to automate these processes. Successful implementation of automated processes is still in the beginning stages. In the meantime, consideration has been given to facilitating automation by adopting standards for the design of recycling-friendly rechargeable batteries via appropriate agreements with the involved manufacturers.

According to the current state of the art, so-called rechargeable battery packs, made up of a plurality of cells connected in series and/or in series, are laboriously broken down into their individual parts in order to obtain the reusable cells therefrom.

SUMMARY OF THE INVENTION

Proceeding from this prior art, the object of the invention described here is to provide a method for processing rechargeable batteries, via which rapid, resource-conserving, cost-effective, and sustainable reprocessing of a rechargeable battery is made possible.

This object is achieved by a novel method according to the present invention.

According to the invention, a method for processing rechargeable batteries is involved, characterized in that a rechargeable battery is discharged, the discharged rechargeable battery is opened, the opened rechargeable battery is broken down into its single cells, and the condition of the single cells is subsequently checked. Reusable single cells may subsequently be reassembled to form a new rechargeable battery, or may be used for replacing nonfunctional or damaged single cells in rechargeable batteries.

Prior to the discharging, in a first advantageous embodiment a preceding visual inspection is conceivable in which the external condition of the rechargeable battery is first checked in order to determine whether any external damage is already detectable. This may be carried out in particular via an appropriate camera system or by an attendant.

Furthermore, in one advantageous embodiment of the method. the invention provides that during the checking of the condition of the single cells, the single cells are sorted into reusable and nonreusable single cells, based on the residual capacity and/or the state of health (SOH) of the single cells.

The residual capacity indicates the quantity of amperes that are deliverable by the rechargeable battery in one hour, i.e., how much energy may be provided by the rechargeable battery over time. The state of health (SOH) represents the characteristic value concerning the aging state of a rechargeable battery, compared to its nominal value or new value. In other words, the SOH indicates how much capacity the rechargeable battery still has available, compared to its original capacity.

The sorting of the single cells particularly preferably takes place based on a set threshold value of the residual capacity and/or of the SOH, the threshold value of the SOH particularly preferably being greater than 50%.

The last-named value is therefore selected, since for an SOH less than 50%, reuse is not meaningful due to the limited remaining life and capacity. Instead, single cells of the rechargeable battery that fall below the set threshold values are sorted out and recycled via a separate path, i.e., broken down into their components.

To allow the quickest possible processing of the rechargeable battery, and at the same time, automation of the process step of opening, to be ensured, in one advantageous embodiment of the method the invention provides that the opening of the rechargeable battery takes place using a flexible robot-assisted opening system. The use of robotic arms known from the prior art is conceivable. It is particularly preferred that the flexible robot-assisted opening system is used to extract the cell levels of the opened rechargeable battery from same. This is because not every rechargeable battery has only one cell level; in fact, some have several cell levels, which, however, must be individually processed in the further steps.

After the rechargeable battery is discharged and opened, it is broken down into its single cells. According to one advantageous embodiment of the method according to the invention, this takes place by means of a laser. The advantage of using a laser for dismantling the rechargeable battery is that a laser has high precision, energy density, and working speed, which has a positive effect on the process economics. In addition, the use of laser allows process automation. The single cells situated in the rechargeable battery are usually joined together by a device, typically a busbar, that connects the single cells. In a further advantageous embodiment, the method according to the invention therefore provides that this device is detached from the single cells by use of the laser.

In a first alternative embodiment, the detachment of the device connecting the single cells takes place by removing the weld spots by means of a laser. A laser beam is directed onto the weld spots that connect the device, in particular a busbar, to the single cells, and the weld spots are removed by this action of the laser beam. The removal of the weld spots preferably takes place by means of a continuous wavelength laser, in particular a fiber laser, having a wavelength that is preferably in the IR range, particularly preferably having a wavelength $\lambda$ of 1070 nm.

To allow the weld spots to be removed as precisely as possible and without unnecessary further material removal, in a further advantageous embodiment of the method the invention provides that the laser beam has a diameter of 30 μm to 110 μm, preferably 80 μm. In addition, in a further advantageous embodiment a laser beam having an energy density of $>3\times10^7$ W/cm$^2$ is used. The laser power is preferably frequency modulated.

In a second alternative embodiment of the method, the invention provides that the detachment of the device, connecting the single cells, from the single cells takes place via thermal cutting at the weld spots by means of the laser. This has the advantage that during the thermal cutting only a small surface is treated, namely, only the circumference of the weld spots.

Here as well, a continuous wavelength laser is preferably used which likewise preferably has its wavelength in the IR range, although a wavelength $\lambda$ of 1070 nm is particularly preferred since it is optimally suited for the thermal cutting around the weld spots.

Also for the thermal cutting, to allow the weld spots to be cut around as precisely as possible and without unnecessary further material removal, in a further advantageous embodiment of the method the invention provides that the laser beam has a diameter of 30 μm to 110 μm, preferably 80 μm. In addition, in a further advantageous embodiment a laser beam having an energy density of $>1\times10^7$ W/cm$^2$ is used.

In a further alternative embodiment, for the thermal cutting at the weld spots a pulsed nanosecond laser is used which preferably has a wavelength $\lambda$ of 1064 nm.

The dewelding process may also take place using frequency-doubled or second-harmonic laser beams, which are generated by IR lasers at 1070 nm or 1064 nm, down to the visible range.

To allow removal of any remnants of the weld spots from the surface of the single cells or to smooth the surface after the removal or cutting, in a further advantageous embodiment of the method the invention provides that after detachment of the device, connecting the single cells, from the single cells, the surface of the single cells is machined by means of a laser. This may be the same laser that was previously used for the removal or cutting. A laser beam having an energy density of $1\times10^3$ to $1\times10^7$ W/cm$^2$, preferably an energy density of $9.9\times10^6$ W/cm$^2$, is preferably used.

In order for the laser beam to be precisely specified during the cutting or removal and also during the subsequent surface machining, in a further advantageous embodiment of the method the invention provides that the laser is aligned by means of a laser scanner.

Moreover, in a further advantageous embodiment of the method the invention provides that after detachment of the device that connects the single cells, the surface is inspected, preferably by an optical device, in particular using a camera system or a camera.

The invention is explained in greater detail below with reference to one exemplary embodiment.

DETAILED DESCRIPTION OF THE PREFERRED EMBODIMENTS

Figure 1:
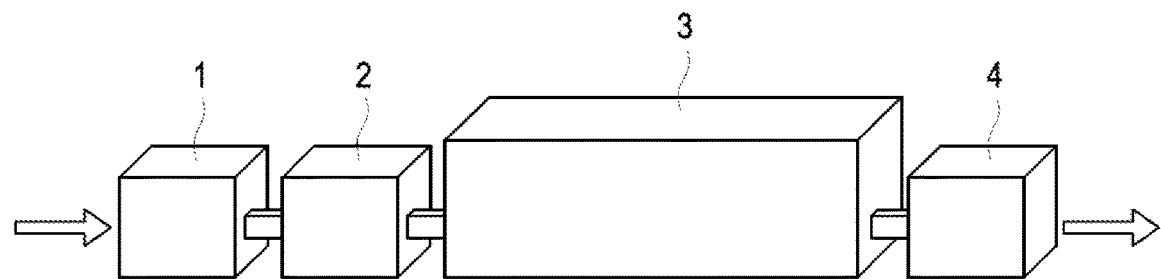
FIG. 1: shows a schematic sequence of the method according to the invention.

FIG. 1 shows the sequence of the method according to the invention in a schematic diagram. The flow direction of the method is illustrated by the arrows present to the left and right of the individual stations or process steps. First, the rechargeable battery to be processed is discharged in the discharging 1. The discharging 1 may be preceded by a visual inspection in order to detect and document possible externally visible damage. After the rechargeable battery has been completely discharged in the discharging 1, or has been discharged to the extent that safe further processing is made possible, the rechargeable battery is opened 2. In the opening 2, cell levels or the single cells of the rechargeable battery are exposed or extracted. This may take place in an automated manner using a robotic arm, for example. After passing through the process step of opening 2, the rechargeable battery, which is now discharged and opened, reaches the process step of breaking down 3. Within the breaking down 3, the rechargeable battery is broken down into its single cells. This takes place by use of a laser, which via thermal cutting detaches the busbar, i.e., the device for connecting the single cells 5, from the single cells 5, so that the busbar may be removed from the rechargeable battery. After removal of the connecting device, i.e., the busbar, the condition of the single cells 5 is checked, the single cells 5 being subdivided into reusable and nonreusable single cells 5. The reusable single cells 5 may be used to produce a new rechargeable battery, or also to replace individual damaged or nonfunctional single cells in other rechargeable batteries.

Figure 2A:
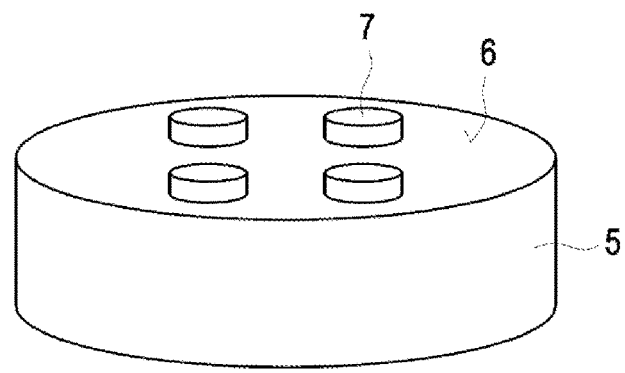
FIG. 2a: shows the negative pole of a single cell in a perspective view.
Figure 2B:
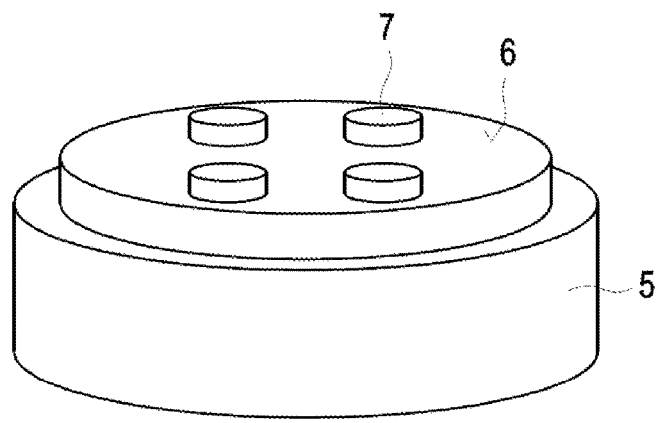
FIG. 2b: shows the positive pole of a single cell in a perspective view.

FIGS. 2a and 2b show the negative and positive poles, respectively, of such a single cell 5 that is freed of the connecting device, i.e., the busbar. Due to the thermal cutting by means of a laser, the weld spots 7 that have connected the single cell 5 to the connecting device, i.e., the busbar, remain on the surface 6 of the positive and negative poles. These weld spots 7 or residues may also be removed from the surface 6 of the poles in a subsequent process step by further treatment with a laser.

Figure 3:
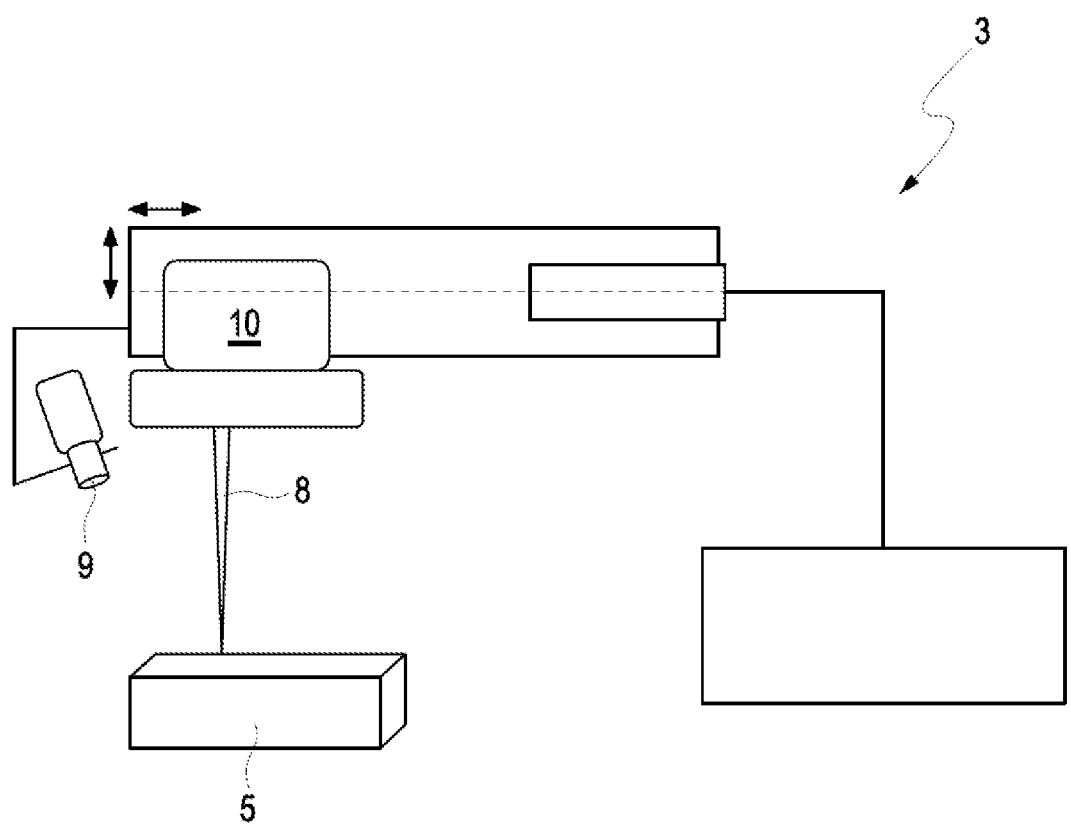
FIG. 3: shows a schematic illustration of the process step of breaking down the rechargeable battery into its single cells by means of a laser.

In addition, FIG. 3 shows the process step of breaking down 3, in particular the removal of the device connecting the single cells 5, i.e., the busbar, from the single cells 5 by means of a laser 8. The exemplary embodiment illustrated in FIG. 3 involves a continuous IR laser 8 having a wavelength of 1070 nm or 1064 nm. The laser beam of the laser 8 is directed onto the weld spots 7 of the connecting device by means of a laser scanner 10, the weld spots 7 being detected using a camera system 9 that is situated at the laser 8. After the weld spots 7 are detected by means of the camera system 9, the laser scanner 10 aims the laser beam of the IR laser 8 at the weld spots 7 and removes them by ablation or thermal cutting.

In a subsequent process step not illustrated in greater detail here, the connecting device that has been detached from the single cells 5 may then be removed from the rechargeable battery, and the single cells 5 may be extracted or supplied to further processing.

A method for processing rechargeable batteries is thus disclosed above which allows rapid, resource-conserving, cost-effective, and sustainable reprocessing of a rechargeable battery.

LIST OF REFERENCE NUMBERS 1 discharging
2 opening
3 breaking down
4 checking
5 single cell
6 surface
7 weld spots
8 laser
9 camera system
10 laser scanner

What is claimed is:

1. A method for processing a rechargeable battery, the method comprising:
    discharging a rechargeable battery;
    opening the discharged rechargeable battery, and breaking down the rechargeable battery into a plurality of single cells;
    wherein breaking down the rechargeable battery into a plurality of single cells comprises using a laser (8) to detach a busbar that connects the plurality of single cells (5) together, from the single cells (5), and further wherein the laser (8) detaches the busbar from the plurality of single cells (5) by removing weld spots (7) connecting the plurality of single cells (5) to the busbar;
    wherein the weld spots (7) to be removed by the laser (8) are detected by means of a camera system (9), and the laser (8) is aligned with the weld spots (7) by means of a laser scanner (10);
    characterized in that the opening (2) of the discharged rechargeable battery takes place using a flexible robot-assisted opening system by extracting the plurality of single cells of the opened rechargeable battery from the rechargeable battery as far as necessary, and then detaching the busbar connecting the plurality of single cells so as to provide a plurality of isolated single cells (5), wherein, after detachment of the busbar from the plurality of single cells (5), the method further comprises using the laser (8) to machine a surface (6) of the plurality of isolated single cells and using the camera system (9) to inspect the surface (6) of the plurality of isolated single cells.

2. The method according to claim 1, characterized in that, after the laser (8) detaches the busbar from the plurality of single cells (5), checking (4) the condition of each of the plurality of single cells (5), and sorting each of the plurality of single cells (5) into (i) reusable single cells, and (ii) nonreusable single cells (5), and further wherein the sorting is based on the residual capacity and/or the state of health (SOH) of each of the plurality of single cells (5).

3. The method according to claim 2, characterized in that the sorting of each of the plurality of single cells (5) takes place based on a set threshold value of the residual capacity and/or of the SOH, and further wherein each of the plurality of single cells (5) determined to be reusable single cells comprises a threshold state of health (SOH) value greater than 50%.

4. The method according to claim 1, characterized in that the detachment of the busbar from the plurality of single cells (5) comprises using the laser (8) to effect thermal cutting at the weld spots (7).

5. The method according to claim 4, wherein the laser comprises a continuous wavelength laser emitting light having a wavelength in the infrared (IR) range.

6. The method according to claim 5 wherein the continuous wavelength laser emits light having a wavelength λ of 1070 nm.

7. The method according to claim 4, wherein the laser comprises a pulsed nanosecond laser.

8. The method according to claim 7 wherein the pulsed nanosecond laser emits light having a wavelength λ of 1064 nm.

* * * * *